Patented Feb. 26, 1952

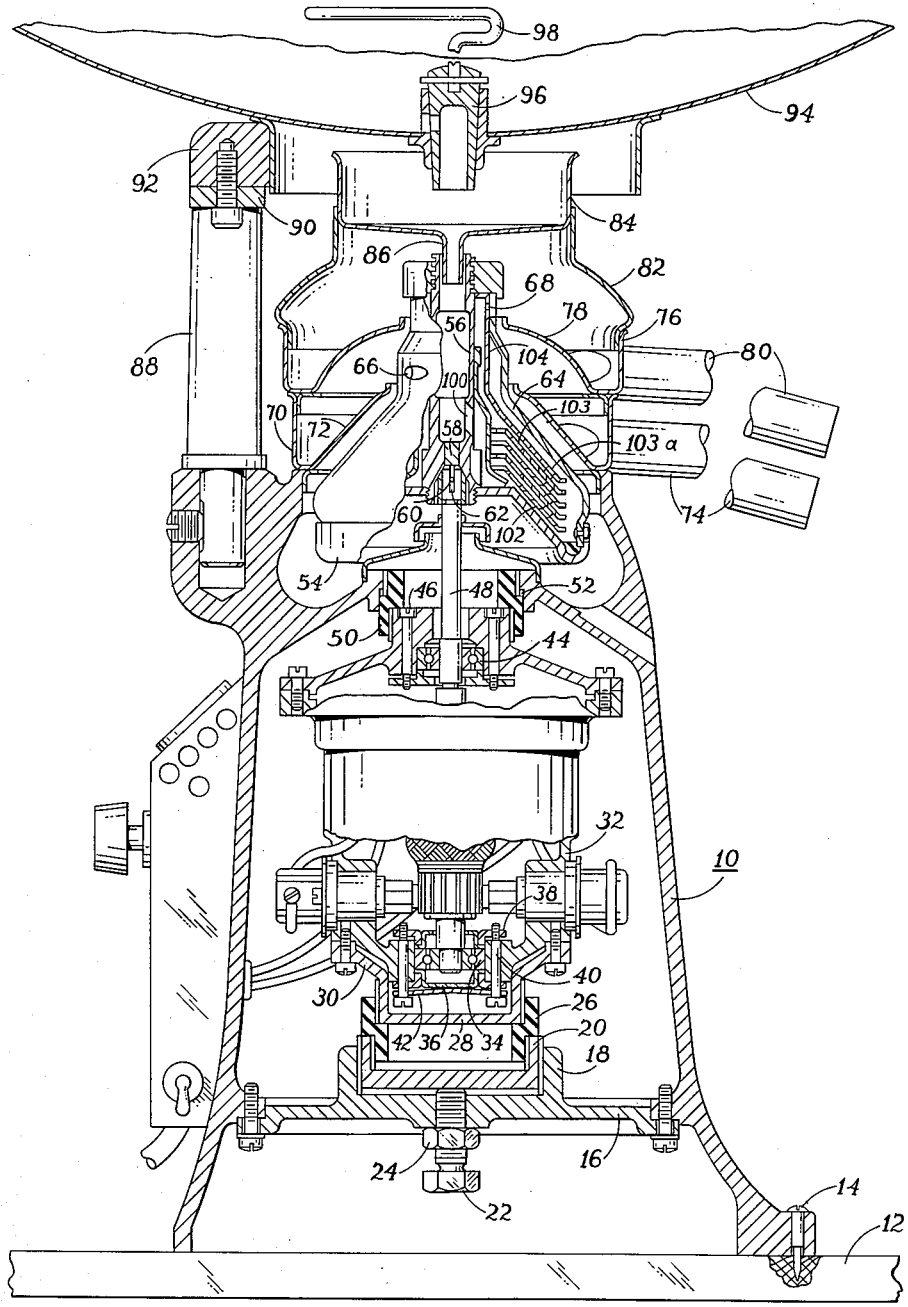

2,587,418

UNITED STATES PATENT OFFICE 2,587,418

MOUNTING MEANS FOR ELECTRIC MOTORS

Eric C. Wahlberg, Stamford, Conn., assignor to Electrolux Corporation, Old Greenwich, Conn., a corporation of Delaware Application May 21, 1949, Serial No. 94,669

3 Claims. (Cl. 233—24)

My invention relates to an improved arrangement for mounting an electric motor in a supporting structure, and more particularly relates to the mounting of an electric motor in a cream separator.

As is well known, the cream separator includes a separator bowl which is rotated at a high speed, in the neighborhood of from 10,000 to 13,000 revolutions per minute, for the purpose of separating cream from whole milk. Heretofore, this high speed of the bowl has been obtained through the use of gearing or a belt drive so that a relatively slow speed motor may be employed, or the separator may be driven by a hand crank.

In order to eliminate the gearing, applicant has arranged to drive the separator bowl directly by means of a high speed electric motor and to this end has mounted the bowl directly on the end of the armature shaft of such a motor. However, in so doing certain problems arose with respect to a suitable mounting of the motor in the supporting structure, which problems have been solved by the present invention.

Further objects and advantages of my invention will be apparent from the following description when considered in connection with the accompanying drawing of which the single figure is a cross-sectional view of a cream separator involving the features of my invention.

Referring to the drawing reference character 10 designates a supporting structure which is generally hollow and may be secured to a floor 12 or other stationary surface, such as a bench, by means of screws 14. The supporting structure 10 includes a removable bottom plate 16, the upper surface of which is formed with an annular flange 18. Received within the flange is a cup shaped member 20, which is vertically displaceable by means of a centrally located stud 22, preferably provided with a locknut 24. A ring 26 of resilient material, such as rubber, has a lower flange which is received within the cup shaped member 20 and an upper flange of somewhat greater diameter which receives the central portion of a bridge member 28. The mating surfaces of the flange 18, cup shaped member 20, ring 26 and bridge member 28 are preferably serrated so as to prevent relative rotation between any of these parts. However, the serrations on the inner surface of the flange 18 and the outer surface of the cup shaped member 20 do not interfere with relative vertical movement between these two parts.

Bridge member 28 is provided with a pair of laterally extending arms 30 which are bolted to the frame 32 of an electric motor. Opposite ends of the frame are provided with openings within which are received ball bearings. The lower bearing includes an outer race 34 which is clamped between a bearing cap 36 and a flanged ring 38 by means of bolts 40 which are threaded into the ring 38 and bear against the ends of a flat spring member 42, the central portion of which in turn bears against the cap 36. As will be seen from the drawing, there is clearance between the ring 38 and the inner surface of the motor frame so that the entire lower bearing assembly may be displaced axially within the opening in the motor frame. Such displacement of one of the bearings is desirable in order to allow for expansion of the armature shaft caused by a rise in temperature. For further details of the construction and advantages of a bearing of this type, reference may be had to Patent No. 1,944,291 issued January 23, 1934 to Erik A. Lundvall.

The upper bearing 44 is fixed to the motor frame by means of the bolts 46 and hence is able to take the thrust load on the armature shaft 48. A resilient ring 50 is disposed between the upper end of the motor frame and the supporting structure 10 and serves to prevent lateral displacement of the motor. As will be noted, there is clearance provided at 52 between the ring 40 and the supporting structure so as to permit vertical adjustment of the motor by means of the stud 22. If desired, the end of the motor frame, the ring 50 and the mating surface of the supporting structure 10 may be serrated so as to restrain the motor frame against rotation.

Reference character 54 designates generally a separator bowl of conventional design, which includes a hollow central member 56, the lower intermediate portion of which is closed by means of a plug 58. Below the plug 58 the hollow member 56 is provided with a transversely extending pin 60 which is received within a slot 62 formed in the upper end of the armature shaft 48 when the bowl 54 is placed upon the shaft.

The outer wall 64 of the separator bowl is formed with a skim milk discharge opening 66 and a cream discharge opening 68. A skim milk receiving member 70 is supported on the upper end of the structure 10 and is provided with an inner wall 72, the upper edge of which should be located just below the opening 66, so that skim milk discharged therethrough will not strike the walls 72, but will be thrown over the upper end of the wall and will be collected in the annular space in the member 70, from whence it may flow through a spout 74.

Supported on the member 70 is a cream collecting member 76 provided with an inner wall 78 which terminates just below the opening 68 so that cream discharged therethrough will be collected in the annular space formed in the member 76, from whence it may flow through the spout 80.

A hollow member 82 is supported by member 76 and in turn supports a pan like member 84 having a centrally located spout 86 extending to within the upper end of the hollow central member 56 of the separator bowl.

A pillar 88 is supported by the structure 10 and at its upper end is provided with a flange 90 to which is bolted a portion of a ring 92. This ring portion 92 supports a large bowl or reservoir 94 having a central opening provided with a valve 96. A handle 98 extends from the movable member of the valve to above the top of bowl 94.

When whole milk is placed in the bowl 94 and the valve 96 is opened, the milk flows by gravity into the member 84 and through the spout 86 into the hollow central member 56. This member is provided with an outlet opening 100 near its lower end, through which the whole milk flows into the interior of the bowl. A number of conical plates 102 are arranged in the bowl. While four of such plates have been shown, actually about twenty are usually provided. When the bowl is rotated at high speed, centrifugal force causes the heavier milk to be separated from the lighter cream, the milk being thrown out against the inner surface of the bowl, while the cream occupies the spaces between the conical members 102. As more whole milk is admitted to the bowl, the skim milk is forced upwardly until it reaches the discharge opening 66, through which it passes into the member 70, as previously described. The cream, on the other hand, is forced through openings 103 near the centers of the conical members 102 and finally is forced up within the cylindrical extension 104, of the uppermost plate 103a until it reaches an opening therein which is in alignment with the discharge opening 68.

In order for the device to operate satisfactorily, the discharge openings 66 and 68 should be located within fairly close limits of the upper edges of the inner walls 72 and 78, respectively. This may be accomplished by adjusting the vertical position of the bowl 54, but inasmuch as this bowl is mounted directly on the upper end of the armature shaft 48, it is thus necessary to adjust the vertical position of the electric motor. As is evident from the drawing, this may be done by means of the threaded stud 22. However, if this stud were to bear directly against the lower end of the motor, it would contact the spring 42 of the lower bearing assembly and would interfere with the displacement of the lower bearing in the motor frame. This might be avoided by providing a plurality of adjusting studs so arranged that they would not contact the lower bearing assembly, but it would be very difficult to equally adjust the several studs. Consequently, in order to make it possible to use a single adjusting member without having it interfere with the displaceability of the lower bearing, I have provided the bridge member 28 which is secured to the motor frame laterally of the bearing opening in the lower end of the frame and which spans this opening with sufficient clearance so that the bridge member cannot contact the displaceable bearing.

While I have shown and described more or less specific embodiments of my invention it is to be understood that this has been done for the purpose of illustration only and that the scope of my invention is not to be limited thereby, but is to be determined by the appended claims.

What I claim is:

1. In a cream separator, a supporting structure having a bottom plate provided with an upwardly extending annular flange, a cup-shaped member seated within said annular flange and mounted for axial movement relative thereto, means for preventing relative rotation between said cup-shaped member and said flange, a cylindrical resilient member mounted in said cup-shaped member, a motor with a vertically disposed shaft mounted in said resilient member above the top of said cup-shaped member, a threaded member extending through said bottom plate and engaging said cup-shaped member for adjusting the vertical position of said motor and shaft, a second cylindrical resilient member mounted for vertical movement in said supporting structure and engaging the upper end of said motor below the mounting of said second cylindrical member, substantially vertically disposed serrations on the abutting surfaces of one of said resilient members and said supporting structure and between said one of said resilient members and said motor for preventing relative rotation therebetween, a separator bowl mounted on the upper portion of said vertical shaft and having a plurality of vertically spaced discharge openings therein, and a plurality of vertically spaced annular collecting chambers surrounding said separator bowl, said motor shaft and separator bowl being vertically adjustable for aligning said openings with said annular chambers.

2. In a cream separator, a supporting structure having a bottom plate provided with an upwardly extending annular flange, a cup-shaped member seated within said annular flange and mounted for axial movement relative thereto, substantially vertically disposed serrations on the abutting surfaces of said cup-shaped member and said flange for preventing relative rotation therebetween, a cylindrical resilient member mounted in said cup-shaped member, a motor with a vertically disposed shaft mounted in said resilient member above the top of said cup-shaped member, a threaded member extending through said bottom plate and engaging said cup-shaped member for adjusting the vertical position of said motor and shaft, a second cylindrical resilient member mounted for vertical movement in said supporting structure and engaging the upper end of said motor below the mounting of said second cylindrical member, substantially vertically disposed serrations on the abutting surfaces of said second resilient member and said supporting structure for preventing relative rotation therebetween, substantially vertically disposed serrations on the abutting surfaces of at least one of said resilient members and said motor for preventing relative rotation therebetween, a separator bowl mounted on the upper portion of said vertical shaft and having a plurality of vertically spaced discharge openings therein, and a plurality of vertically spaced annular collecting chambers surrounding said separator bowl, said motor shaft and separator bowl being vertically adjustable for aligning said openings with said annular chambers.

3. Motor mounting means comprising a supporting structure having a bottom plate provided with an upwardly extending annular flange, said flange having substantially vertically disposed serrations on its inner surface, a cup-shaped member having substantially vertically disposed serrations on its peripheral surface and mounted for vertical movement within said flange, a threaded element extending through said bottom plate and engaging said cup-shaped member, a cylindrical resilient ring mounted in said cup-shaped member, said ring and cup-shaped member having substantially vertically disposed serrated abutting surfaces, a motor having a vertically disposed shaft extending upwardly therefrom, a bearing secured to the lower end of said shaft, means mounting said bearing for limited vertical movement in the lower end of said motor, a bridge member secured to the lower end of said motor in spaced relation to said mounting means and seated in said resilient ring above the top of the cup-shaped member, said bridge member and resilient ring having substantially vertically disposed serrated abutting surfaces, said supporting structure having an opening surrounding said shaft above said motor, a second cylindrical resilient ring mounted in said opening, said second ring and supporting structure having substantially vertically disposed serrated abutting surfaces, a second bearing secured to said shaft, and means on the upper portion of said motor for mounting said second bearing and engaging said second resilient ring substantially below the engagement of the ring and support, said last named means and said resilient ring having substantially vertically disposed serrated abutting surfaces.

ERIC C. WAHLBERG.

REFERENCES CITED

The following references are of record in the file of this patent:

UNITED STATES PATENTS

| Number | Name | Date |
| --- | --- | --- |
| 1,944,291 | Lundvall | Jan. 23, 1934 |
| 2,265,053 | Anderson | Dec. 2, 1941 |